United States Patent [19]
Howard

[11] Patent Number: 6,084,398
[45] Date of Patent: Jul. 4, 2000

[54] RATE OF ROTATION MEASUREMENT USING BACK-EMFS ASSOCIATED WITH WINDINGS OF A BRUSHLESS DC MOTOR

[75] Inventor: David E. Howard, Hazel Green, Ala.

[73] Assignee: The United States of America as represented by the Administrator of the Nautical Aeronautics and Space Administation, Washington, D.C.

[21] Appl. No.: 09/128,635

[22] Filed: Jul. 27, 1998

[51] Int. Cl.[7] .............................. G01P 3/46; H02K 11/00
[52] U.S. Cl. .................. 324/177; 324/207.25; 310/68 B
[58] Field of Search .................................. 324/160, 161, 324/163, 166, 177, 207.15, 207.16, 207.25; 310/68 B; 318/721, 799, 805, 490, 656, 661; 361/239, 240, 242

[56] References Cited

U.S. PATENT DOCUMENTS

| | | |
|---|---|---|
| 4,017,726 | 4/1977 | Skutecki . |
| 4,868,497 | 9/1989 | Wallrafen ................. 324/160 |
| 5,321,342 | 6/1994 | Kruse . |
| 5,394,102 | 2/1995 | Mori et al. ............. 324/177 X |

*Primary Examiner*—Gerard Strecker
*Attorney, Agent, or Firm*—James J. McGroary

[57] ABSTRACT

A system and method are provided for measuring rate of rotation. A brushless DC motor is rotated and produces a back electromagnetic force (emf) on each winding thereof. Each winding's back-emf is integrated and multiplied by the back-emf associated with an adjacent winding. The multiplied outputs associated with each winding are combined to produce a directionally sensitive DC output proportional only to the rate of rotation of the motor's shaft.

15 Claims, 3 Drawing Sheets

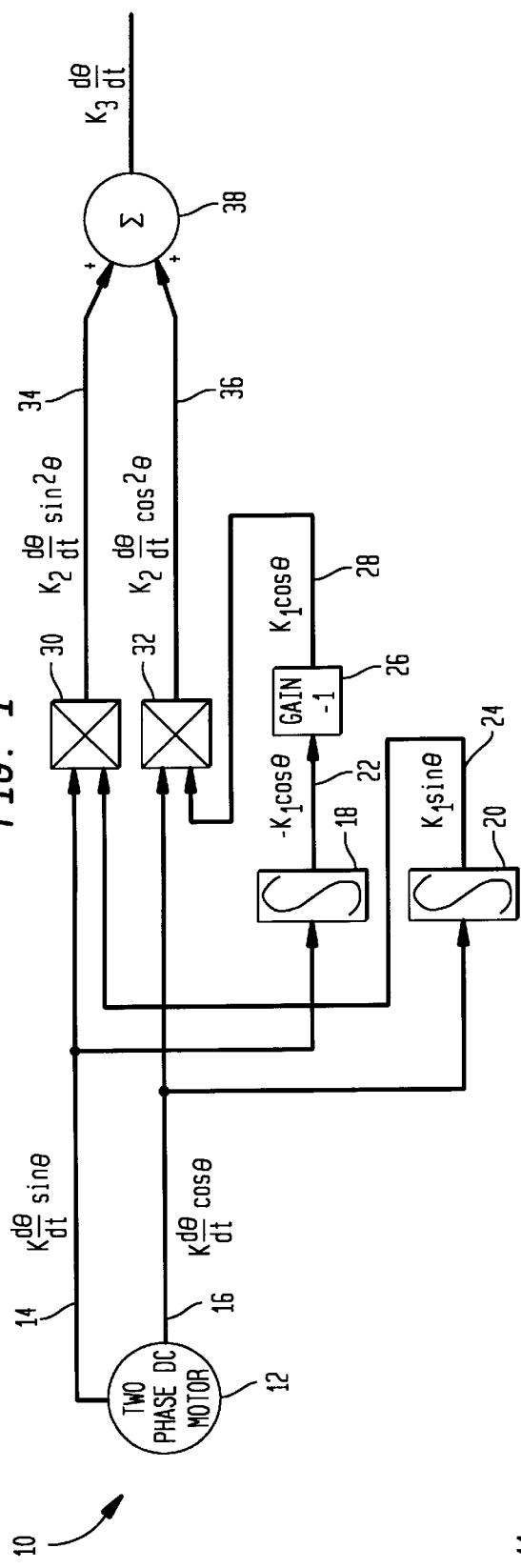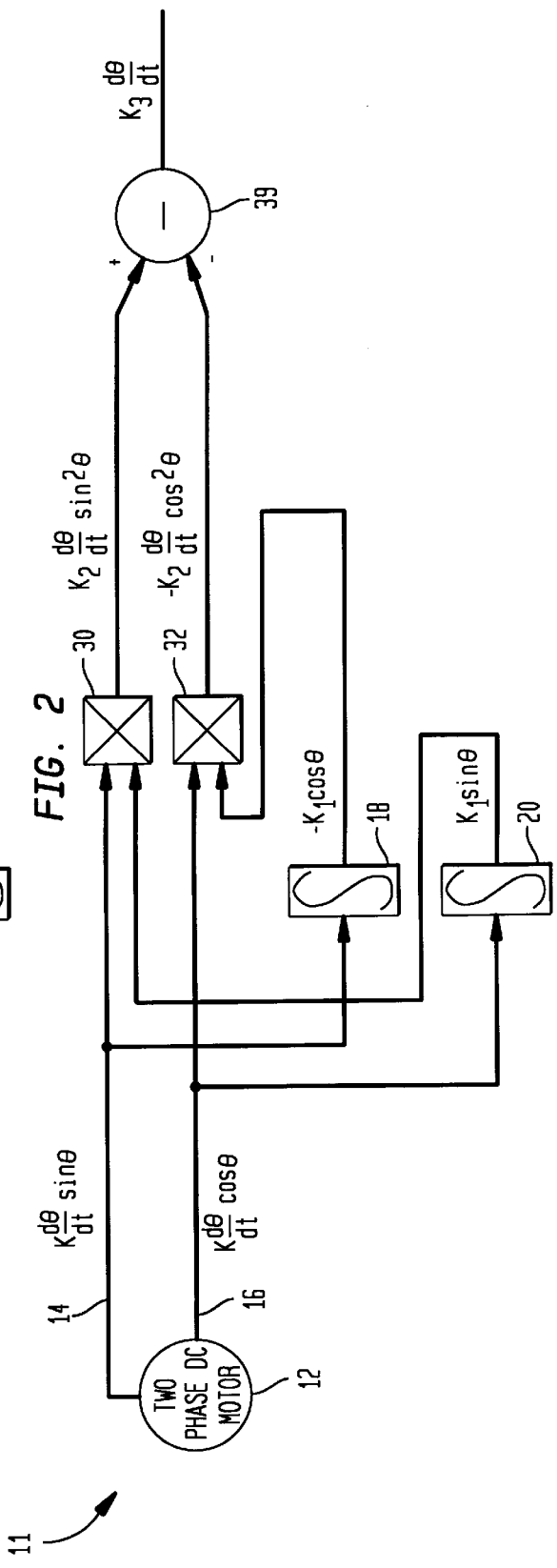

6,084,398

RATE OF ROTATION MEASUREMENT USING BACK-EMFS ASSOCIATED WITH WINDINGS OF A BRUSHLESS DC MOTOR

CROSS-REFERENCE TO RELATED PATENT APPLICATIONS

This patent application is co-pending with one related patent application Ser. No. 09/128,635 entitled "DIRECTIONLESS RATE OF ROTATION MEASUREMENT USING BRUSHLESS DC MOTOR", filed on the same day as this patent application and owned by the same assignee as this patent application.

ORIGIN OF THE INVENTION

The invention was made by an employee of the United States Government and may be manufactured and used by or for the Government for governmental purposes without the payment of any royalties.

BACKGROUND OF THE INVENTION

1. Field of the Invention

This invention relates to measuring rate of rotation. More specifically, the invention is an apparatus and method that develops a DC signal indicative of rate of rotation using a brushless DC motor.

2. Description of the Related Art

Angular rate sensing devices or tachometers are well known in the art. Such devices can be constructed using motors with mechanical brushes, using a brushless DC motor combined with position sensors, or using resolver or encoder developed rate sensors. However, each of these devices has drawbacks.

Tachometers built using motors with mechanical brushes present an ongoing maintenance concern in that the mechanical brushes wear out. Further, mechanical brush-type tachometers are prone to electrical arcing which affects device performance.

Tachometers built using a brushless DC motor use position sensors to commutate the back electromagnetic force (emf) signals of the phases of the motor. However, commutation typically takes place using discrete hall sensors to measure position which causes a relatively large ripple in the rate signal. To control the ripple problem, linear position sensors (e.g., resolvers, etc.) can be used for commutation purposes. However, the fact that a position sensor is still required adds weight, complexity and cost to the overall system. Also, use of any position sensor requires some excitation signal which means that wires must be led to the sensor thereby adding weight and cost. Further, the excitation signal must be produced by some apparatus thereby adding more weight and cost.

A resolver developed rate sensor requires some type of differentiation because a resolver is a position sensor, and position must be differentiated to obtain rate. However, as is known in the art, differentiation circuitry is noisy. A further disadvantage is that an excitation signal is required which requires both the leading of wires to the sensor and the need for apparatus to provide such excitation signal.

An encoder developed rate sensor measures time between discrete pulses of an encoder to provide a position change for a given time change, i.e., a rate. Once again, a drawback associated with this type of device is the need for wires to carry excitation signals to the sensor and the associated hardware needed to generate such excitation signal. Further, encoder developed rate sensors are inherently less accurate (especially at slower rates of rotation) because of the discrete nature of the encoder outputs.

SUMMARY OF THE INVENTION

Accordingly, it is an object of the present invention to provide an apparatus and method for measuring rate of rotation.

Another object of the present invention is to provide an apparatus and method for producing a DC signal indicative of rate of rotation.

Still another object of the present invention is to provide an apparatus and method for producing a DC signal indicative of rate of rotation that is reliable and simple to implement.

Yet another object of the present invention is to provide an apparatus and method for producing a DC signal indicative of rate of rotation that does not require the use of position sensors.

A still further object of the present invention is to provide an apparatus and method for producing a direction sensitive DC signal indicative of rate of rotation.

Other objects and advantages of the present invention will become more obvious hereinafter in the specification and drawings.

In accordance with the present invention, a system and method are provided for measuring rate of rotation. A brushless DC motor has a shaft driven to rotation and windings disposed about its shaft. When the shaft rotates, a back electromagnetic force (emf) is produced on each winding. The back-emf includes information on rate of rotation. Each of a plurality of integrators is coupled to a corresponding one of the windings for integrating the back-emf associated therewith to produce an integrated output. Each of a plurality of multipliers is coupled to one of the windings to receive the back-emf associated therewith, and is further coupled to one of the integrators to receive the integrated output associated with another of the windings adjacent the one winding. As a result, each multiplier produces a multiplied output. A combining circuit is coupled to the multipliers for combining the multiplied outputs to produce a DC output proportional only to the rate of rotation of the shaft.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic block diagram of one embodiment for implementing the present invention using a two-phase brushless DC motor;

FIG. 2 is a schematic block diagram of another embodiment for implementing the present invention using a two-phase brushless DC motor;

DESCRIPTION OF THE PREFERRED EMBODIMENT(S)

Figure 3:
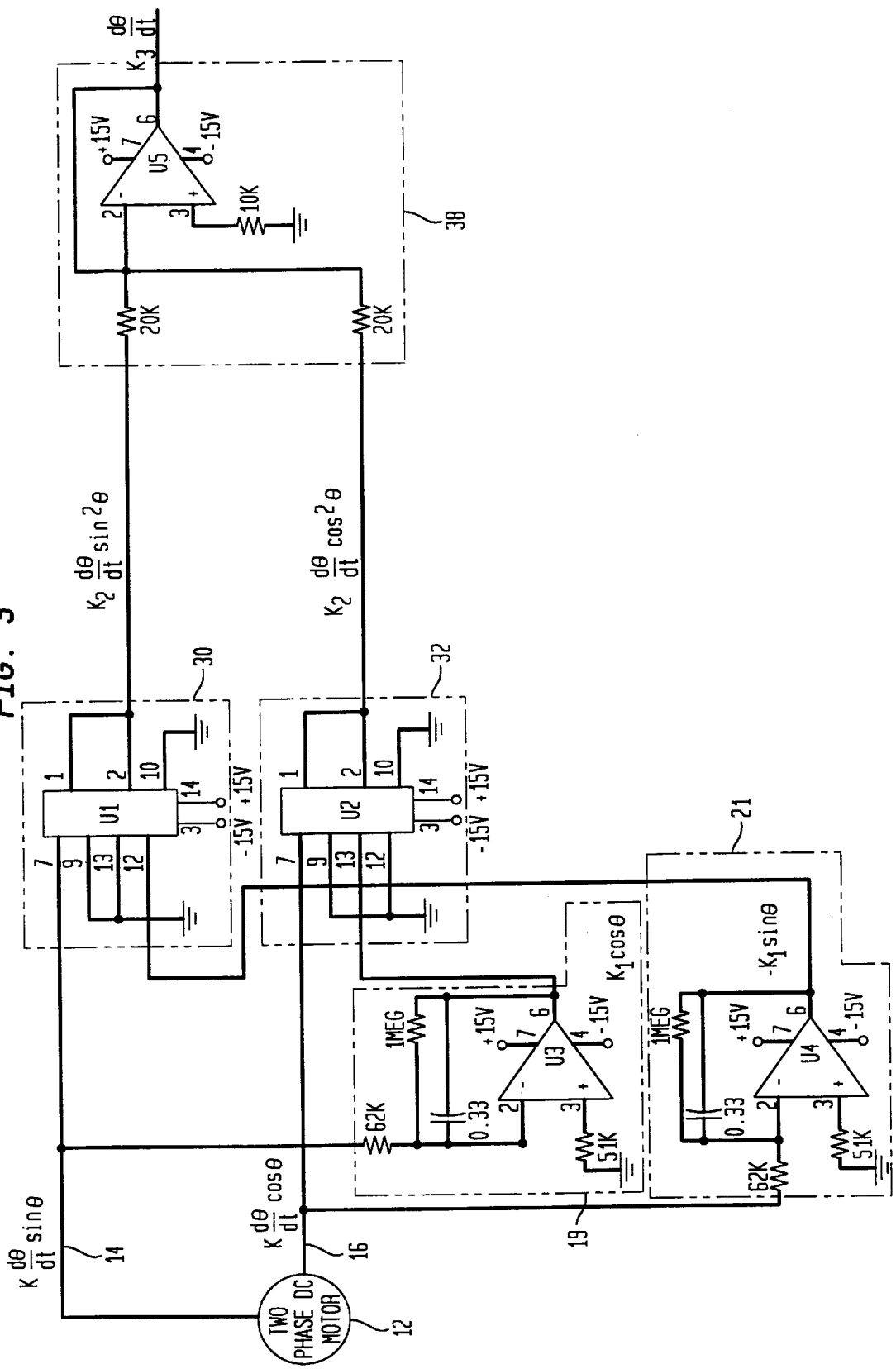
FIG. 3 is a detailed electrical schematic implementation of still another embodiment of the present invention using a two-phase brushless DC motor.

Referring now to the drawings, and more particularly to FIG. 1, one system embodiment for implementing the present invention is shown and referenced generally by the numeral 10. System 10 uses a two-phase brushless DC motor 12 having a rotatable shaft (not shown) coupled to some apparatus that will cause the shaft to rotate. It is the rotation of the shaft (of motor 12) that the present invention is designed to measure. It is to be understood that the apparatus and method of the present invention can also make use of a three-phase brushless DC motor as will be described further below.

DC motor 12 is any standard two-phase brushless DC motor having two windings (not shown) disposed about its rotatable shaft. Such motors and their operation are well known in the prior art and will therefore not be described herein. DC motor 12 produces a back electromagnetic force (or "back-emf" as it will be referred to hereinafter) on each of its two windings when the motor's shaft rotates. Phased outputs from each of these windings tapped at 14 and 16 provide the two-phase output of motor 12. As is known in the art, each of outputs 14 and 16 is an AC signal including the back-emf constant of motor 12, the rate of rotation of the shaft of motor 12 and the position of the shaft. More specifically, the output at 14 is of the form $$K(d\theta/dt) \sin \theta \quad (1)$$

where K represents the back-emf constant of motor 12, ($d\theta/dt$) is the rate of rotation of the motor shaft and $\theta$, in general, is the electrical angle of the motor shaft, i.e., $\theta$ cycles from 0–360° n times per mechanical revolution of the motor shaft where n is one-half the number of poles of motor 12. Note that the electrical angle is equal to the mechanical angle of the motor shaft for two-pole motors. The output at 16 is of the form $$K(d\theta/dt) \cos \theta \quad (2)$$

Outputs 14 and 16 are integrated at integrators 18 and 20, respectively, to integrate out the rate of rotation portion (or $d\theta/dt$) from each of outputs 14 and 16. The resulting output signals 22 and 24 are therefore only related to the electrical angle $\theta$ of the respective phase where output 22 is $$-K_1 \cos \theta \quad (3)$$

and output 24 is $$K_1 \sin \theta \quad (4)$$

where $K_1$ represents the combination of the back-emf constant of motor 12 and the DC gain of integrator 18 or 20, respectively. Note that while there may be some minor gain difference between the apparatus implementing integrator 18 and the apparatus implementing integrator 20, such difference is generally negligible and will therefore be ignored herein. For the illustrated embodiment, output 22 must be inverted and is therefore multiplied by a gain of minus one at gain circuit 26 to produce output 28 of the form $$K_1 \cos \theta \quad (5)$$

The integrated outputs 28 and 24 are multiplied with back-emf outputs 14 and 16. That is, back-emf output 14 is multiplied with integrated output 24 at multiplier 30. Similarly, back-emf output 16 is multiplied with integrated output 28 at multiplier 32. Multiplier 30 thus produces an output 34 of the form $$[K(d\theta/dt) \sin \theta]*[K_1 \sin \theta] = K_2(d\theta/dt) \sin^2 \theta \quad (6)$$

where $K_2$ represents the combination of the back-emf constant of motor 12 and the DC gains of integrator 20 and multiplier 30. Similarly, multiplier 32 produces an output 36 of the form $$[K(d\theta/dt) \cos \theta]*[K_1 \cos \theta] = K_2(d\theta/dt) \cos^2 \theta \quad (7)$$

where $K_2$ represents the combination of the back-emf constant of motor 12 and the DC gains integrator 18 and multiplier 32. Once again, it is assumed that any difference in DC gain between multipliers 30 and 32 is negligible and can therefore be ignored.

The multiplied outputs at 34 and 36 are next combined in such a way that a DC signal is produced proportional only to rate of rotation. With the form of outputs 34 and 36 given as in equations (6) and (7), the portion of outputs 34 and 36 related to the electrical angle of the motor shaft can be eliminated by adding outputs 34 and 36 at an adder 38. Specifically, $$[K_2(d\theta/dt) \sin^2 \theta] + [K_2(d\theta/dt) \cos^2 \theta] = K_3(d\theta/dt) \quad (8)$$

where $K_3$ represents the combination of the back-emf constant of motor 12 and the DC gains associated with all of the subsequent electrical components of system 10 through adder 38. The output of adder 38 is direction sensitive in that a positive or negative value is indicative of the direction of rotation of the motor shaft.

Note that equation (8) takes advantage of the trigonometric identity $$\sin^2 X + \cos^2 X = 1 \quad (9)$$

in order to make the ultimate output a DC signal proportional only to the rate of rotation of the motor shaft. Accordingly, the combination of components coupled to motor 12 is not limited to the particular combination depicted in FIG. 1. For example, the combination of integrator 18 and gain circuit 26 could be replaced by circuitry configured to operate as an inverting integrator. Another possibility is depicted by system 11 in FIG. 2 where gain circuit 26 is eliminated and polarity inversion is dealt with at a subtractor 39 in order to eliminate position information, i.e., take advantage of the trigonometric identity in equation (9). More specifically, the polarity of the output of multiplier 32 is inverted at subtractor 39. Thus, it is apparent that the present invention can be implemented in a variety of ways.

By way of illustrative example, FIG. 3 depicts a detailed electrical schematic of still another embodiment of the present invention. Combinations of circuit elements contained within dashed-line boxes represent a particular functional block with common reference numerals being used where appropriate. In this embodiment, inverting integrators 19 and 21 are used to integrate outputs 14 and 16, respectively. The polarity of the output of inverting integrator 21 (i.e., $-K_1 \sin\theta$) is then reversed by applying it to the inverting pins of multiplier 30 as shown. The U1 and U2 multipliers can be implemented with differential input multiplier circuits such as the MPY100 available from Burr Brown Corporation, Tucson, Ariz. The U3, U4 and U5 components can be implemented using operational amplifiers such as the OP-07A available from Precision Monolithics Inc., Santa Clara, Calif.

Figure 4:
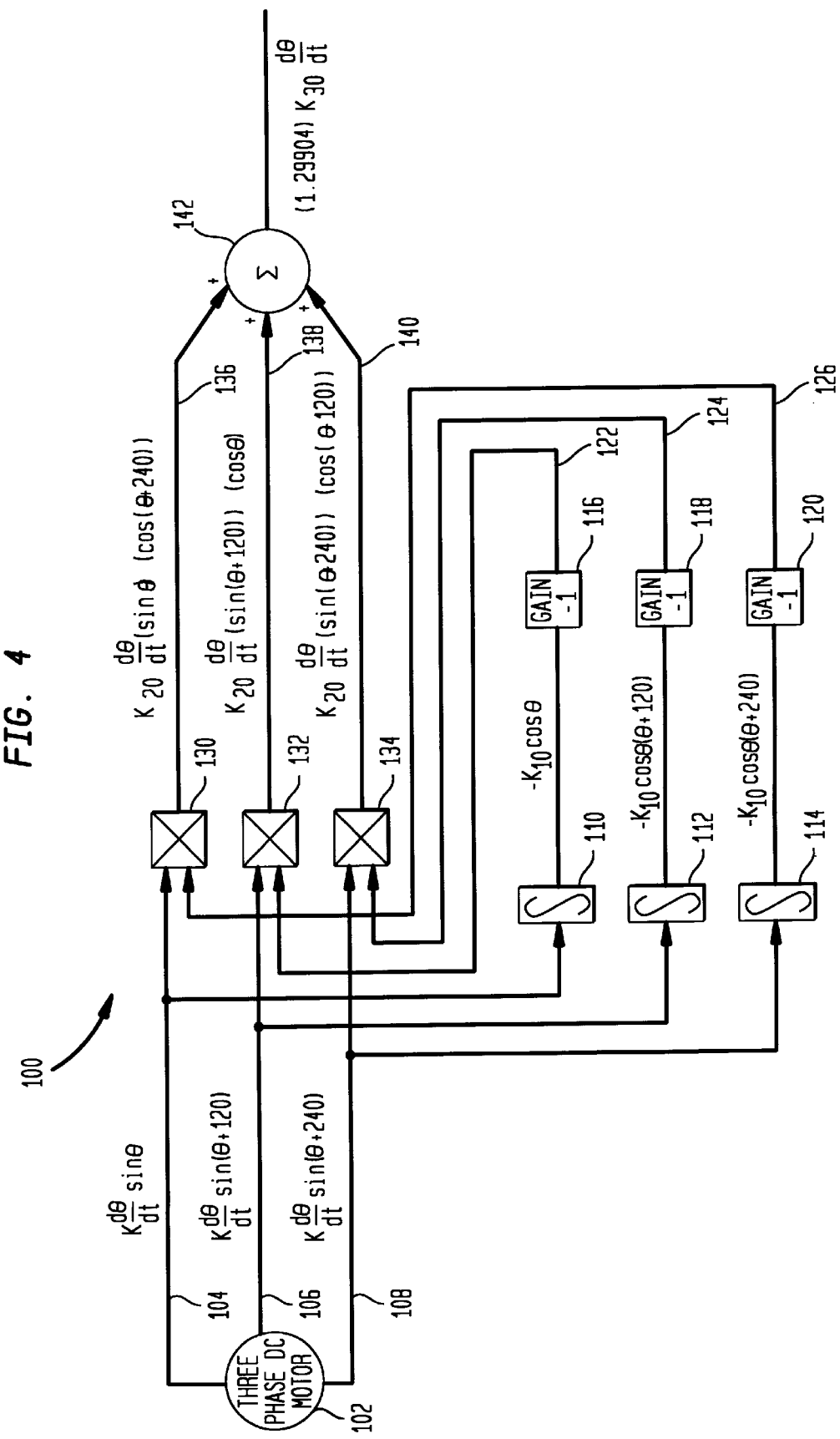
FIG. 4 is a schematic block diagram of another embodiment for implementing the present invention using a three-phase brushless DC motor.

As mentioned above, the present invention could also be implemented using a three-phase brushless DC motor. Such a system is shown and referenced generally by numeral 100 in FIG. 4. DC motor 102 is any standard three-phase brushless DC motor having three windings disposed about its rotatable shaft (not shown). Phased outputs from the windings of motor 102 are tapped at outputs 104, 106 and 108, and are of the form $$K(d\theta/dt) \sin \theta \quad (10)$$

$$K(d\theta/dt) \sin (\theta+120) \quad (11)$$

$$K(d\theta/dt)\sin(\theta+240) \quad (12)$$

as is well known in the art. Outputs 104, 106 and 108 are integrated by respective integrators 110, 112 and 114. For proper polarity manipulation, the output of integrators 110, 112 and 114 are inverted by a respective inverting gain circuit 116, 118 and 120. Note that each integrator/gain circuit could be replaced by an inverting integrator. The inverted and integrated outputs 122, 124 and 126 of equations (10), (11) and (12) are of the form $$K_{10}\cos\theta \quad (13)$$

$$K_{10}\cos(\theta+120) \quad (14)$$

$$K_{10}\cos(\theta+240) \quad (15)$$

Each back-emf output from motor 102 is multiplied by one of the inverted and integrated outputs developed from one of the motor's adjacent windings. For example, in the illustrated embodiment, back-emf output 104 is multiplied by output 126 at multiplier 130 to produce $$K_{20}(d\theta/dt)\sin\theta\cos(\theta+240) \quad (16)$$

where $K_{20}$ represents the combination of the back-emf constant of motor 102 and the DC gains of integrator 114 and multiplier 130. In similar fashion, back-emf 106 is multiplied by output 122 at multiplier 132 to produce $$K_{20}(d\theta/dt)\sin(\theta+120)\cos\theta \quad (17)$$

where $K_{20}$ represents the combination of the back-emf constant of motor 102 and the DC gains of integrator 110 and multiplier 132. Finally, back-emf 108 is multiplied by output 124 at multiplier 134 to produce $$K_{20}(d\theta/dt)\sin(\theta+240)\cos(\theta+120) \quad (18)$$

where $K_{20}$ represents the combination of the back-emf constant of motor 102 and the DC gains of integrator 112 and multiplier 134. As with the above-described two-phase embodiment, it is assumed that gain differences between individual integrators and multipliers is negligible and that, therefore, the gain constants $K_{10}$ and $K_{20}$ are the same for each phase.

As in the two-phase motor embodiment, the multiplied outputs 136, 138 and 140 are next combined to produce a DC signal proportional only to rate of rotation of the motor shaft, i.e., eliminate the portion of the multiplied outputs related to the electrical angle of the motor shaft. With the form of equations (16), (17) and (18), this can be accomplished by adding multiplied outputs 136, 138 and 140 at an adder 142 and taking advantage of the following trigonometric identity $$[\sin X^*\cos(X+240)]+[\sin(X+120)\cos X]+\ldots[\sin(X+240)^*\cos(X+120)]=1.29904 \quad (19)$$

Accordingly, the output of adder 142 is of the form $$(1.29904)K_{30}(d\theta/dt) \quad (20)$$

and is proportional only to rate of rotation. The constant $K_{30}$ represents the back-emf constant of motor 102 and the DC gains associated with all of the subsequent electrical components of system 100 through adder 142. The output of adder 142 is direction sensitive in that a positive or negative value is indicative of the direction of rotation of the motor shaft.

The advantages of the present invention are numerous. Rate of rotation is measured in a directionally sensitive fashion without the need to sense shaft position. Thus, the reliability of a brushless DC motor can be exploited without the need to outfit the motor with position sensing equipment. The present invention makes use of simple and quiet (i.e., integrators versus differentiators) off-the-shelf components to provide a DC signal indicative of rate of rotation.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A system for measuring rate of rotation, comprising:
   a brushless DC motor having a shaft driven to rotation and having windings disposed about said shaft wherein, when said shaft rotates, a back electromagnetic force (emf) is produced on each of said windings, said back-emf including information on rate of rotation of said shaft;
   a plurality of integrators, each of said plurality of integrators coupled to a corresponding one of said windings for integrating said back-emf associated therewith to produce an integrated output;
   a plurality of multipliers, each of said plurality of multipliers coupled to one of said windings to receive said back-emf associated therewith and coupled to one of said plurality of integrators to receive said integrated output associated with another of said windings adjacent said one of said windings, wherein each of said plurality of multipliers produces a multiplied output; and
   a combining circuit coupled to said plurality of multipliers for combining each said multiplied output to produce a DC output proportional only to said rate of rotation of said shaft.

2. A system as in claim 1 wherein said brushless DC motor is a two-phase brushless DC motor having a first winding and a second winding, said back-emf of said first winding being of the form $K(d\theta/dt)(\sin\theta)$, and said back-emf of said second winding being of the form $K(d\theta/dt)(\cos\theta)$, where K is the back-emf constant of said two-phase brushless DC motor, $(d\theta/dt)$ is a signal equal to said rate of rotation of said shaft and $\theta$ is the electrical angle of said shaft, and further comprising an inverter cooperating with a first of said plurality of integrators that is coupled to said first winding for inverting polarity of said integrated output produced by said first of said plurality of integrators.

3. A system as in claim 2 wherein said combining circuit is an adder.

4. A system as in claim 2 wherein said inverter is a gain circuit having a gain of minus one, said gain circuit being coupled to said first of said plurality of integrators to invert polarity of said integrated output produced thereby.

5. A system as in claim 2 wherein said inverter is incorporated in said first of said plurality of integrators wherein said first of said plurality of integrators is an inverting integrator.

6. A system as in claim 1 wherein said brushless DC motor is a two-phase brushless DC motor having a first winding and a second winding, said back-emf of said first winding being of the form $K(d\theta/dt)(\sin\theta)$, and said back-emf of said second winding being of the form $K(d\theta/dt)(\cos\theta)$, where K is the back-emf constant of said two-phase brushless DC motor, $(d\theta/dt)$ is a signal equal to said rate of rotation of said shaft and θ is the electrical angle of said shaft, and wherein said combining circuit is a subtractor.

7. A system as in claim 1 wherein said brushless DC motor is a three-phase brushless DC motor having a first winding, a second winding and a third winding, said back-emf of said first winding being of the form K(dθ/dt)(sin θ), said back-emf of said second winding being of the form K(dθ/dt)(sin (θ+120)) and said back-emf of said third winding being of the form K(dθ/dt)(sin(θ+240)), where K is the back-emf constant of said three-phase brushless DC motor, (dθ/dt) is a signal equal to said rate of rotation of said shaft and θ is the electrical angle of said shaft, and further comprising an inverter cooperating with each of said plurality of integrator for inverting polarity of each said integrated output.

8. A system as in claim 7 wherein said combining circuit is an adder.

9. A system as in claim 7 wherein said inverter comprises a plurality of gain circuits, each of said plurality of gain circuits having a gain of minus one, a corresponding one of said plurality of gain circuits being coupled to a corresponding one of said plurality of integrators to invert polarity of said integrated output produced thereby.

10. A system as in claim 7 wherein said inverter is incorporated into each of said plurality of integrators wherein said plurality of integrators are a plurality of inverting integrators.

11. A method of producing a DC output indicative of rate of rotation, comprising the steps of:

providing a brushless DC motor having a shaft and windings disposed about said shaft;

rotating said shaft wherein a back electromagnetic force (emf) is produced on each of said windings, said back-emf including information on rate of rotation of said shaft;

integrating each said back-emf to produce an integrated output associated with each of said windings;

multiplying each said back-emf associated with one of said windings by said integrated output associated with another of said windings adjacent said one of said windings, wherein a plurality of multiplied outputs are produced; and combining said plurality of multiplied outputs to produce a DC output proportional only to said rate of rotation of said shaft.

12. A method according to claim 11 wherein said brushless DC motor is a two-phase brushless DC motor having a first winding and a second winding, said back-emf of said first winding being of the form K(dθ/dt)(sin θ), and said back-emf of said second winding being of the form K(dθ/dt)(cos θ), where K is the back-emf constant of said two-phase brushless DC motor, (dθ/dt) is a signal equal to said rate of rotation of said shaft and θ is the electrical angle of said shaft, and further comprising the step of inverting polarity of said integrated output generated from said back-emf of said first winding.

13. A method according to claim 12 wherein said step of combining comprises the step of adding.

14. A method according to claim 11 wherein said brushless DC motor is a three-phase brushless DC motor having a first winding, a second winding and a third winding, said back-emf of said first winding being of the form K(dθ/dt)(sin θ), said back-emf of said second winding being of the form K(dθ/dt)(sin(θ+120)) and said back-emf of said third winding being of the form K(dθ/dt)(sin(θ+240)), where K is the back-emf constant of said three-phase brushless DC motor, (dθ/dt) is a signal equal to said rate of rotation of said shaft and θ is the electrical angle of said shaft, and further comprising the step of inverting polarity of each said integrated output.

15. A method according to claim 14 wherein said step of combining comprises the step of adding.

* * * * *